(No Model.)
J. R. BLOSER.
CURRYCOMB.
No. 517,259.   Patented Mar. 27, 1894.
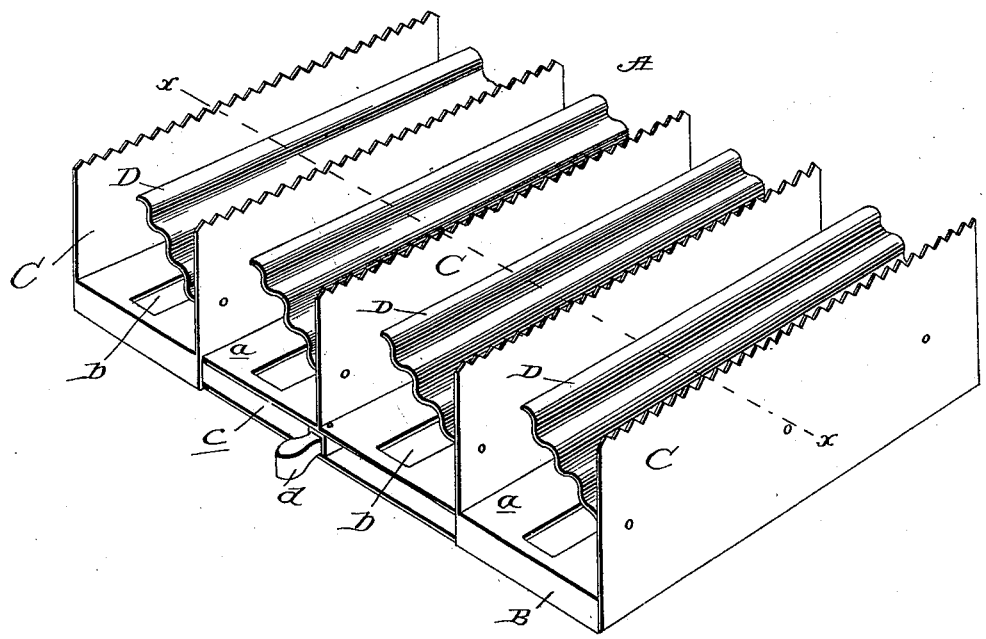
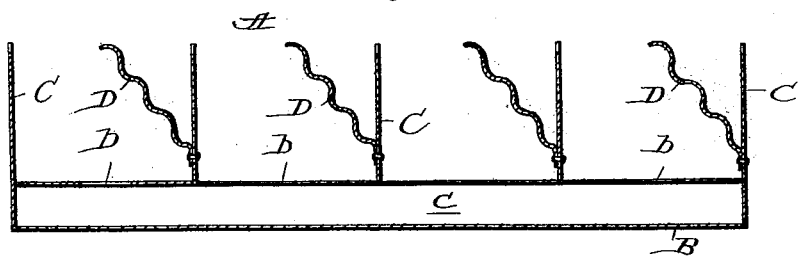
Witnesses:
C. H. Reeder
N. F. Matthews.
Inventor
John R. Bloser.
By James J. Sheehy
Attorney
THE NATIONAL LITHOGRAPHING COMPANY,
WASHINGTON, D. C.

UNITED STATES PATENT OFFICE.

JOHN R. BLOSER, OF WASHINGTON, ILLINOIS.

CURRYCOMB.

SPECIFICATION forming part of Letters Patent No. 517,259, dated March 27, 1894.

Application filed February 3, 1893. Serial No. 460,914. (No model.)

*To all whom it may concern:*

Be it known that I, JOHN R. BLOSER, a citizen of the United States, residing at Washington, in the county of Tazewell and State of Illinois, have invented certain new and useful Improvements in Currycombs; and I do declare the following to be a full, clear, and exact description of the invention, such as will enable others skilled in the art to which it appertains to make and use the same.

My invention relates to improvements in curry combs, and it has for its general object to provide a highly efficient comb of a cheap and simple construction and one adapted to catch and retain the dust raised by the teeth and thereby prevent the same from settling back upon the animal.

A further object of the invention is to provide a comb embodying means whereby the depth of the teeth may be readily regulated so as to suit the comb to long or short haired animals.

Other objects and advantages will appear from the following description and claims when taken in connection with the annexed drawings in which—

Figure 1 is an inverted perspective view of my improved comb, and, Fig. 2, is a section taken in the plane indicated by the line $x$, $x$, of Fig. 1.

Referring by letter to said drawings:—A, indicates my improved comb which is preferably formed from metal, although any other suitable material may be employed, and B, indicates the body of the same. This body is hollow as illustrated and is provided with a series of angularly disposed plates or flanges C, which are arranged at suitable intervals and have their edges toothed in the ordinary or any approved manner. The body B, is provided in its inner or lower wall $a$, as better shown in Fig. 1, with a series of elongated apertures $b$, which are designed to enable the dust raised by the teeth to enter the body so that it will not settle back upon the animal; and the said body is also provided in one of its end walls (preferably at the middle) with an opening $c$, through which the dust may be removed.

In practice, I prefer to remove the collected dust from the body of the comb by knocking the same, and I therefore provide the body with a knob or projection $d$, so as to prevent the comb from being damaged or injured.

D, indicates the gage strips which are corrugated or fluted lengthwise and are composed of pliable metal. These gage strips are secured at one of their longitudinal edges to the toothed plates or flanges C, and they are arranged obliquely as shown, so that they may be moved toward the plates to which they are connected to lessen the depth of the teeth and adapt the comb for short haired animals, or away from their plates so as to increase the depth of the teeth and adapt the comb for long haired animals.

Among the advantages derived from the employment of these fluted or corrugated strips, might be mentioned the fact that they adapt the comb for currying long and short haired horses. They also serve to catch and retain the heavy dust and other substances, and loose hair, while the lighter dust passes into the body of the comb, as before described.

A comb of the character described, will be found very effective in use, as it will enable a hostler to better and more quickly clean an animal, than combs heretofore employed.

Having described my invention, what I claim is—

1. In a curry comb, the combination with a series of rigid or immovable toothed plates or flanges; of gage strips having one of their edges fixedly secured to the toothed plates, so that their free edges may be moved toward and from the same, substantially as and for the purpose set forth.

2. In a curry comb, the combination with a series of toothed plates or flanges; of the fluted or corrugated gage strips formed from pliable metal and connected to the toothed plates or flanges; said strips being adapted to be adjusted to regulate the depth of the teeth of the bars or plates, substantially as specified.

3. A curry comb having toothed plates and also having longitudinally fluted or corrugated strips fastened and interposed between said toothed plates and disposed at an angle with respect thereto; the said fluted or corrugated strips being adapted to receive and hold the heavier dust and hair removed from an animal, substantially as and for the purpose set forth.

In testimony whereof I affix my signature in presence of two witnesses.

JOHN R. BLOSER.

Witnesses:
H. M. LONG,
W. E. THOMPSON.